United States Patent
Lin et al.

(10) Patent No.: US 6,891,723 B1
(45) Date of Patent: May 10, 2005

(54) HARD DISK DRIVE TRAY MODULE

(75) Inventors: Cheng-Wang Lin, Panchiao (TW); Yu-Lin Chen, Panchiao (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 10/964,609

(22) Filed: Oct. 15, 2004

(30) Foreign Application Priority Data

Jan. 20, 2004 (TW) ...................................... 93201175 U

(51) Int. Cl.⁷ ................................................ G06F 1/16
(52) U.S. Cl. ..................... 361/685; 361/724; 312/223.1
(58) Field of Search ................................. 361/683–685, 361/724–730; 312/223.1, 223.2, 333

(56) References Cited

U.S. PATENT DOCUMENTS

| | | | | |
|---|---|---|---|---|
| 4,937,806 A | * | 6/1990 | Babson et al. .............. | 720/651 |
| 6,625,014 B1 | * | 9/2003 | Tucker et al. ............... | 361/685 |
| 6,820,953 B2 | * | 11/2004 | Wojcik ..................... | 312/332.1 |
| 2004/0100762 A1 | * | 5/2004 | Yuan et al. ................. | 361/685 |
| 2004/0190266 A1 | * | 9/2004 | Chung ........................ | 361/724 |

* cited by examiner

*Primary Examiner*—Lynn Feild
*Assistant Examiner*—Anthony Q. Edwards
(74) *Attorney, Agent, or Firm*—Rabin & Berdo, P.C.

(57) ABSTRACT

A hard disk drive (HDD) tray module is disclosed. The hard disk drive tray module comprises a tray, a bezel and a hook device, wherein the bezel is located between the tray and the hook device, and the hook device and the bezel are attached to the tray. The hook device comprises a handle, a latch, a spring, an E ring and two hook plates, wherein the handle is inserted into the spring, the spring is inserted into the latch, and the E ring is installed onto the handle. With the use of the spring and the E ring, the latch can be slid along the handle.

25 Claims, 3 Drawing Sheets

HARD DISK DRIVE TRAY MODULE

RELATED APPLICATIONS

The present application is based on, and claims priority from, Taiwan Application Serial Number 93201175, filed Jan. 20, 2004, the disclosure of which is hereby incorporated by reference herein in its entirety.

FIELD OF THE INVENTION

The present invention relates to a hard disk drive (HDD) tray module, and more particularly, to a hard disk drive tray module that is assembled rigidly and installed easily.

BACKGROUND OF THE INVENTION

A hard disk drive is a major data storage device of a computer. The hard disk drive is used to store data, and the overwhelming majority of the data necessary to operate the hardware and software of the computer is stored on the hard disk drive. The larger the capacity of the hard disk drive, the more data the computer can store. The hard disk drive, then, is the most important data storage device on the computer because if it is damaged, the computer will not function properly, if at all.

A hard disk drive is mainly composed of a magnetic disc, a magnetic head, a motor and connecting circuits; and these components are all set within an outer case. When the hard disk drive accesses data, the location of the data is first read out, and then the magnetic head is moved to the designated location of the magnetic disc to access the data. When the data is stored into the hard disk drive, an available storage location is found first, and then the magnetic head is moved to the designated location to store the data.

A hard disk drive is typically installed in a hard disk drive tray and is carried within it. Currently, most hard disk drive trays adopt a side hook design. However, the side hook design increases the width of the entire hard disk drive device such that it cannot conform to the 1U server standard width requirement. Moreover, most current hard disk drive tray designs cannot bear an acceleration exceeding 32G and are broken easily during a falling test with 32G acceleration.

SUMMARY OF THE INVENTION

One objective of the present invention is to provide a hard disk drive tray module with a hook device having a latch, an E ring, a spring and a handle. With the use of the E ring and the spring, the latch can be slid along the handle so that the hard disk drive tray module can be inserted and taken out.

Another objective of the present invention is to provide a hard disk drive tray module with a latch that is fabricated by a powder metal injection technique. The structure of the latch can thereby be strengthened so as to prevent the latch from breaking as a result of falling.

Still another objective of the present invention is to provide a hard disk drive tray module with a bezel having a concave geometry that mirrors a curved portion of a handle. The concave geometry of the bezel together with the curved portion of the handle forms a recess by which the tray can be easily installed and removed.

According to the aforementioned objectives, the present invention further provides a hard disk drive tray module that has a front plate with a catch hole and two hook holes, a bezel that is connected to the front plate and has an opening and a clasp protruding out of it, and a hook device that fits over the bezel. The hook device includes a handle that has a curved midsection and straight ends, one end being fastened into the clasp of the bezel. The hook device also includes a latch that has a catch and an open end. The catch sequentially passes through and hooks into the opening of the bezel and the catch hole of the front plate. The hook device also has a spring that is put into the open end of the latch and into which one end of the handle is put, and two hook plates, each of which is connected to an end of the handle and is affixed to the front plate of the tray and which pass through the bezel and the hook holes of the front plate. One hook plate is also connected to a bottom side of the latch.

According to a preferred embodiment of the present invention, the bezel includes upper and lower panels that are connected to the top and bottom edges of the bezel face and extend out from the bezel face. The upper and lower panels both have a concave indentation that mirror the geometry of the curved midsection of the handle. The handle is located between the upper and lower panels, and a recess is thereby available to insert a finger behind the curved midsection of the handle. The hook device also includes an E ring that is installed onto the handle.

Because the hook device of the present invention is a latch design using the E ring and spring, the latch can be slid along the handle to release the catch. As a result, the hard disk drive tray module can be installed and removed easily. Furthermore, the latch of the hard disk drive tray module is fabricated by a powder metal injection technique such that the structure of the latch is substantially strengthened so as to withstand 32G acceleration in the falling test.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses a hard disk drive tray module with a hook device that is composed of a latch, an E ring, a spring and a handle. The E ring and the spring can be slid along the handle allowing the hard disk drive tray module to be installed and removed easily. Moreover, with the use of a powder metal injection technique, the structure of the latch can be strengthened to prevent the latch from being broken. In order to make the illustration of the present invention more explicit, the following is described with reference to FIGS. 1–3.

Figure 1:
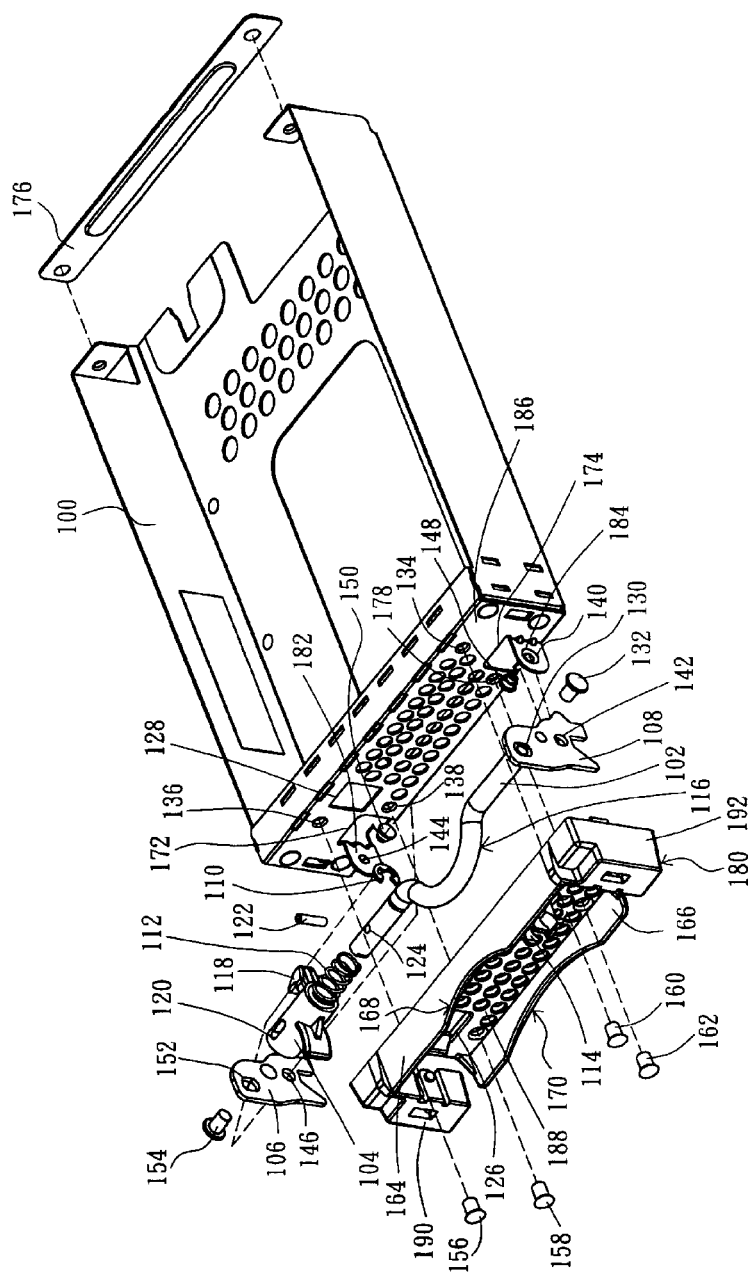
FIG. 1 illustrates a schematic diagram showing the assembling of a hard disk drive tray module in accordance with a preferred embodiment of the present invention.

Referring to FIG. 1, a schematic diagram is shown of the assembling of a hard disk drive tray module in accordance with a preferred embodiment of the present invention. The hard disk drive tray module is mainly composed of a tray 100 into which a hard disk drive can be installed. The tray has a catch hole 128 in a front plate 186; and a hook hole 172 and a hook hole 174 are respectively located on the two sides of the lower edge of the front plate 186. The front plate 186 further includes a bracket 182 and a bracket 184 which are respectively located at edges of the hook hole 172 and hook hole 174 nearest to the sides of the front plate 186. The bracket 182 and the bracket 184 protrude perpendicularly from the front plate 186. The bracket 182 and the bracket 184 respectively include a fastener hole 144 and a fastener hole 140. Furthermore, the front plate 186 comprises a fastener hole 134, a fastener hole 136, a fastener hole 138 and a fastener hole 178, wherein the fastener hole 136 and the fastener hole 138 are near the bracket 182, and the fastener hole 134 and the fastener hole 178 are near the bracket 184.

The hard disk drive tray module of the present invention further includes a hook device composed of a handle 102, a spring 112, a latch 104, a hook plate 106, a hook plate 108 and an E ring 110. The body of the latch 104 is preferably tubular. A catch 118 is set on an outer side of the latch 104, and a hole 120 is set in the wall of the body of the latch 104. The spring 112 can be inserted into one end of the latch 104. The shape of the handle 102 resembles a "ς"; that is, the handle 102 has a curved midsection 116 located between two straight segments. One straight segment of handle 102 is inserted into the spring 112 and further includes a hole 124. The E ring 110 is installed on the segment of the handle 102 that is inserted into the spring 112. When assembling the latch 104, the spring 112 is inserted into the latch 104, one segment of the handle 102 is inserted into the spring 112, the E ring 110 is installed onto the straight segment of the handle 102 nearest the latch 104, and a pin 122 is inserted sequentially into the hole 120 of the latch 104 and then the hole 124 of the handle 102. Hence, the motion of latch 104 is constrained along the length of the straight segment of the handle 102 that is inserted into the spring 112. The hook plate 106 is fastened to the other end of the latch 104, and a fastener 154 is inserted through a hole 152 of the hook plate 106 and is fastened to the straight segment of the handle 102 that is inserted into the spring 112 so as to join together the hook plate 106, the latch 104 and the handle 102. The hook plate 108 is connected to the other straight segment of the handle 102, and a fastener 132 is inserted through a hole 130 of the hook plate 108 and is fastened to the end of the handle 102 so as to join together the hook plate 108 and the handle 102.

In the present invention, the latch 104 can be fabricated by a powder metal injection technique so as to strengthen the structure of the hard disk tray 100. As a result, in a preferred embodiment of the present invention, the latch 104 can withstand 32G acceleration in a falling test without breaking, thereby ensuring that the hard disk drive tray will not depart from the fixed location.

The hard disk drive tray module of the present invention further includes a bezel 180 which comprises a face plate 188, an upper panel 164, a lower panel 166, a side block 190 and a side block 192, wherein the upper panel 164 and the lower panel 166 are respectively connected to the top and bottom edge of the face plate 188 and are perpendicular to the face plate 188. The side block 190 and the side block 192 are respectively located on two sides of the bezel 180 and connected to the upper panel 164, such that the side block 190, the side block 192, the upper panel 164 and the lower panel 166 form a shape like an empty five-sided block with the face plate 188. The upper panel 164 and the lower panel 166 respectively have a concave indentation 168 and a concave indentation 170 facing outward. When the handle 102 of the hook device is installed on the bezel 180, the curved midsection 116 of the handle 102 is centrally located between the concave indentation 168 of the upper panel 164 and the concave indentation 170 of the lower panel 166, thereby forming a handle recess between the curved midsection 116 of the handle 102 and the face plate 188 of the bezel 180 into which a user may place his fingers. The face plate 188 has an opening 126 that is aligned with the catch hole 128 of the front plate 186, into both of which the catch 118 of the latch 104 is inserted. The face plate 188 further includes a clasp 114 which protrudes out from the face plate 188 and into which the free straight segment of the handle 102 is fastened.

In the present invention, because the hook device of the hard disk drive tray module has the spring 112 and the E ring 110, the latch 104 can be slid along the handle 102. Thus, the latch 104 can be easily hooked onto and unhooked from the face plate 188 of the bezel 180 and the front plate 186 of the tray 100.

When the hard disk drive tray module of the present invention is assembled, the hook device is assembled before the other components. First, the spring 112 is inserted into the latch 104, a straight segment of the handle 102 is inserted into the spring 112, and the E ring 110 is installed onto the straight segment of the handle 102 that is inserted into the spring 112. Then, the pin 122 is inserted into the hole 120 of the latch 104 and the pin hole 124 of the handle 102, thereby constraining the motion of the latch 104 along the straight segment of the handle 102 that is inserted into the spring 112. Next, the fastener 154 is inserted through the hole 152 of the hook plate 106 and is fastened to the straight segment of the handle 102 that is inserted into the spring 112. The hook plate 106 is then fixed to the latch 104 and the handle 102. The fastener 132 is inserted through the hole 130 of the hook plate 108 and is fastened to the other end of the handle 102. The assembly of the hook device of the hard disk drive tray module is thus complete.

Figure 2:
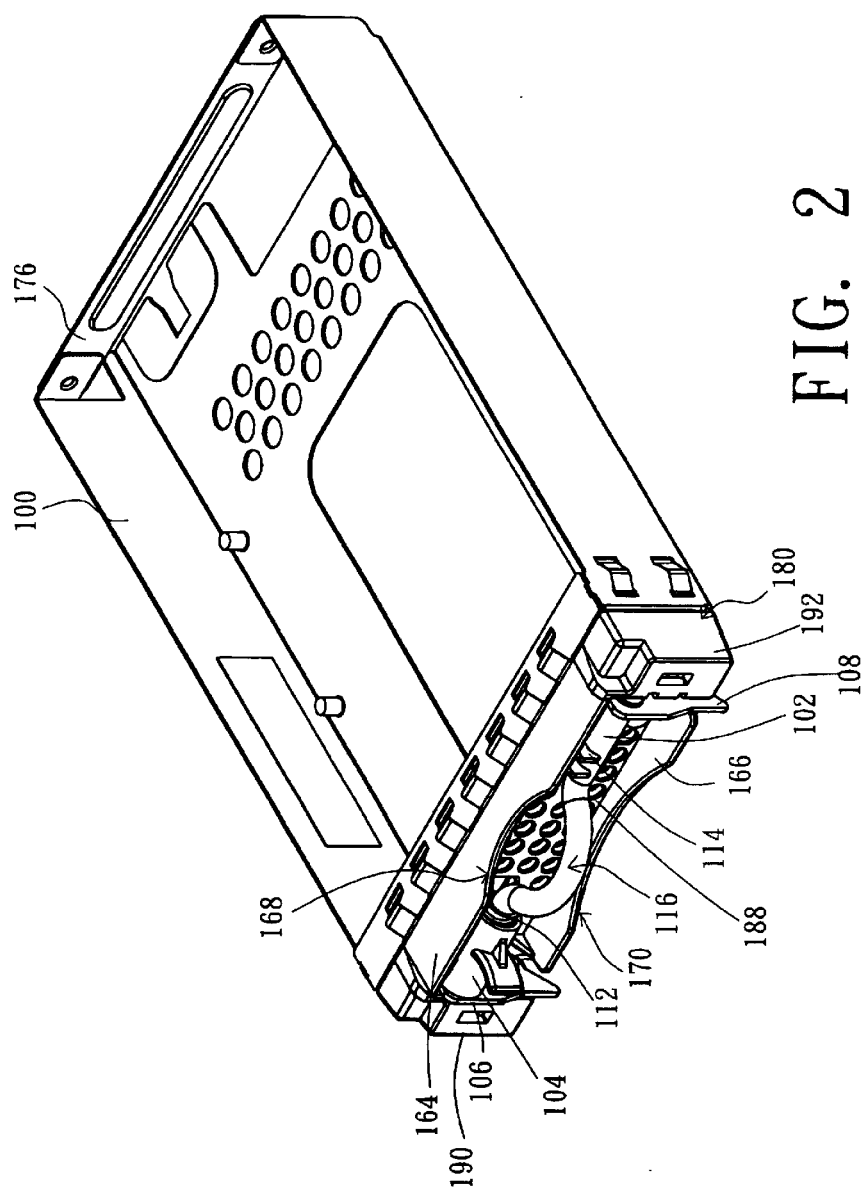
FIG. 2 illustrates a three-dimensional diagram showing an assembled hard disk drive tray module in accordance with a preferred embodiment of the present invention.

Next, the assembled hook device is attached to the bezel 180 and the front plate 186 of the tray 100. The catch 118 of the latch 104 of the hook device passes through the opening 126 of the face plate 188 of the bezel 180, and the catch hole 128 of the front plate 186 of the tray 100 in sequence. The straight segment of the handle 102 of the hook device is pressed into the clasp 114 of the bezel 180. Simultaneously, the hook plate 106 and the hook plate 108 of the hook device are respectively inserted into the slot between the side block 190 and the face plate 188 and the slot between the side block 192 and the face plate 188. Simultaneously, a portion of the hook plate 106 and a portion of the hook plate 108 are respectively inserted into the hook hole 172 and the hook hole 174. Next, the fastener 150 is inserted through the hole 146 of the hook plate 106 and is fastened to the fastener hole 144 of the bracket 182 so as to fix one end of the hook device onto the front plate 186. The fastener 148 is inserted through the hole 142 of the hook plate 108 and is fastened to the fastener hole 140 of the bracket 184 so as to fix another end of the hook device to the front plate 186. Subsequently, the fastener 156, the fastener 158, the fastener 160 and the fastener 162 are inserted through the holes of the face plate 188 of the bezel 180 and are respectively fastened into the fastener hole 136, the fastener hole 138, the fastener hole 134 and the fastener hole 178 so as to fix the bezel 180 onto the front plate 186 of the tray 100. Then, a back plate 176 is fastened onto a posterior of the tray 100. The assembly of the hard disk drive tray module is thereby complete, as illustrated in FIG. 2.

Figure 3:
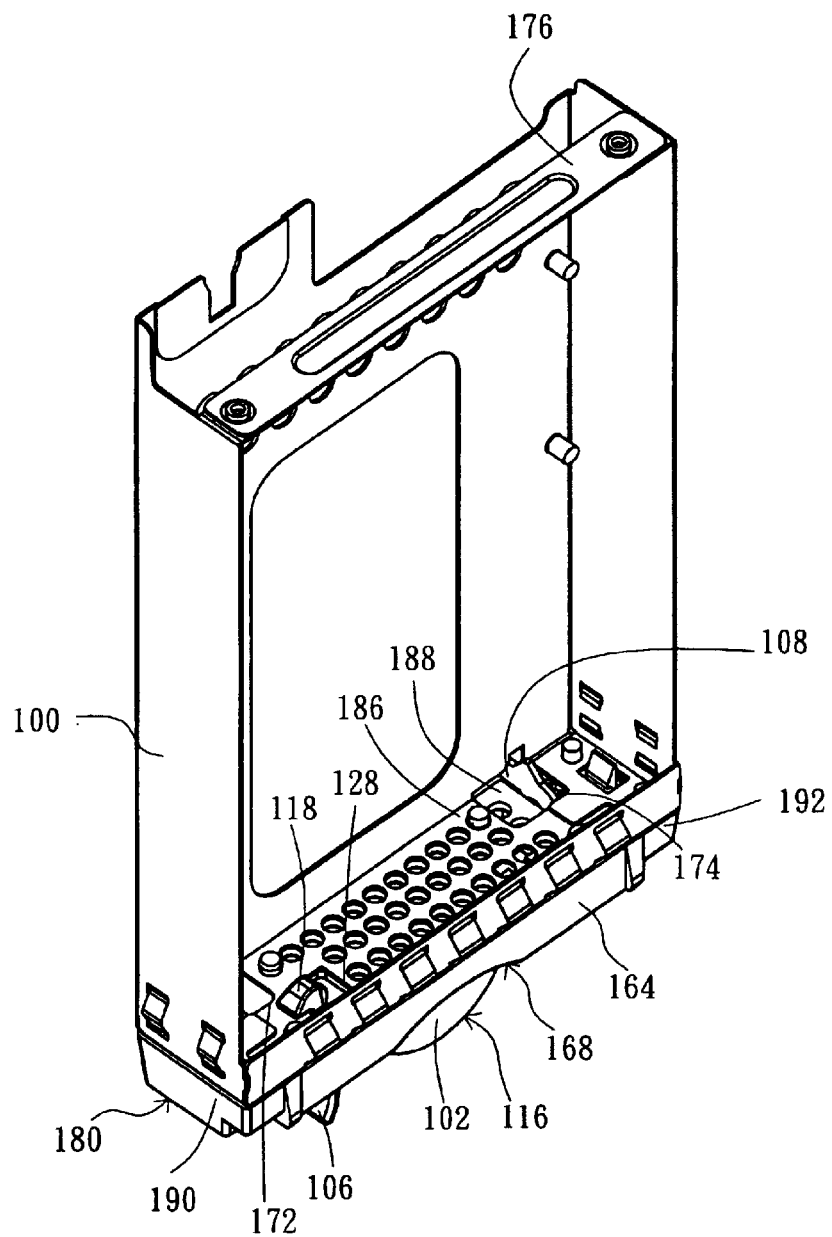
FIG. 3 illustrates a three-dimensional diagram showing an interior of a hard disk drive tray module in accordance with a preferred embodiment of the present invention.

Referring to FIG. 3, a three-dimensional diagram is shown of an interior of the hard disk drive tray module in accordance with a preferred embodiment of the present invention. FIG. 3 clearly illustrates that the catch 118 of the latch 104 passes through the catch hole 128 of the front plate 186 of the tray 100 and hooks onto the front plate 186 in the assembled hard disk drive tray module. The hook plate 108 of the handle 102 passes through the face plate 188 of the bezel 180 and the front plate 186 of the tray 100 in sequence and is stationed in the hook hole 174. Although not illustrated in FIG. 3, the hook plate 106 of the handle 102 passes through the face plate 188 of the bezel 180 and the front plate 186 of the tray 100 in sequence and is stationed in the hook hole 172.

When the hard disk drive tray module is to be taken out, a user places a finger, such as a middle finger, through the concave openings of the upper panel 164 and the lower panel 166 and into the recess between the curved midsection 116 of the handle 102 and the face plate 188 of the bezel 180, slides the latch 104 along the handle 102 toward the curved midsection 116 with his thumb, and rotates the handle 102 downward. As a result, the hook device of the tray 100 dislodges the hard disk drive tray module and allows it to be easily removed.

Therefore, according to the aforementioned description, one advantage of the present invention is that a hook device of the hard disk drive tray module includes a latch design in which an E ring and a spring are cooperatively used. The latch, therefore, can be slid along the handle to facilitate easy installation and removal of the hard disk drive tray module.

According to the aforementioned description, the other advantage of the present invention is that a latch of a hook device is fabricated by a powder metal injection technique. Therefore, the structure of the latch can be strengthened to withstand a falling test of 32G without breaking.

According to the aforementioned description, still another advantage of the present invention is that panels of a bezel of the hard disk drive tray module have concave indentations that mirror the geometry of a curved midsection of a handle. A recess is formed between the concave openings of the panels and the curved midsection of the handle such that a finger may be inserted, and thus installing and removing the hard disk drive tray module is made more convenient.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A hard disk drive tray module, comprising:
    a tray, wherein the tray comprises a front plate, and a catch opening and two hook openings are set in the front plate;
    an face plate, wherein the face plate is connected to the front plate, and the face plate comprises an opening and a clasp; and
    a hook device, wherein the face plate is located between the tray and the hook device, and the hook device comprising:
        a handle, wherein the handle comprises a curved midsection, a first straight segment and a second straight segment respectively located on two sides of the curved midsection, and the second straight segment is fastened in the clasp;
        a latch, wherein the latch has an open end, and a side of the latch comprises a catch that sequentially passes through and hooks into the opening of the face plate and the catch opening of the front plate;
        a spring, wherein the spring is inserted into the open end of the latch, and the first straight segment of the handle is inserted into the spring;
        a first hook plate, the first hook plate is connected to a bottom side of the latch and the first straight segment of the handle and is fastened onto the front plate; and
        a second hook plate, wherein the second hook plate is connected to the second straight segment of the handle and is fastened onto the front plate, and the first hook plate and the second hook plate pass through the face plate and respectively pass through the hook openings.

2. The hard disk drive tray module according to claim 1, wherein the front plate further comprises two brackets protruding from the front plate, and the first hook plate and the second hook plate are fastened to the brackets.

3. The hard disk drive tray module according to claim 1, wherein the face plate comprises an upper panel and a lower panel respectively connected to the top and bottom edges of the face plate, and the upper panel and the lower panel protrude from the face plate.

4. The hard disk drive tray module according to claim 3, wherein the face plate further comprises two side blocks respectively located on the left and right edges of the face plate, and the side blocks are connected to the upper panel.

5. The hard disk drive tray module according to claim 4, wherein there is a slot between each of the side blocks and the face plate.

6. The hard disk drive tray module according to claim 5, wherein the first hook plate and the second hook plate pass through the slot between each of the side blocks and the face plate and the hook openings in sequence.

7. The hard disk drive tray module according to claim 3, wherein the upper panel and the lower panel each has a concave indentation.

8. The hard disk drive tray module according to claim 7, wherein the curved midsection of the handle is centrally located between the concave indentation of the upper panel and the concave indentation of the lower panel.

9. The hard disk drive tray module according to claim 1, wherein the side of the latch further comprises an opening, and the first straight segment of the handle comprises an opening.

10. The hard disk drive tray module according to claim 9, wherein the hook device further comprises a pin, and the pin is located in the opening of the side of the latch and the opening of the first straight segment.

11. The hard disk drive tray module according to claim 1, wherein the hook device further comprises an E ring installed on the first straight segment.

12. The hard disk drive tray module according to claim 1, wherein the latch is made of a powder metal injection material.

13. A hard disk drive tray module, comprising:
    a tray, wherein the tray comprises a front plate, and a catch opening and two hook openings are set in the front plate;
    a bezel, wherein the bezel is connected to the front plate, and the bezel comprises an opening; and
    a hook device, wherein the bezel is located between the tray and the hook device, and the hook device comprising:
        a handle, wherein the handle comprises a curved midsection, a first straight segment and a second straight segment respectively located on two sides of the curved midsection;

a latch, wherein the latch has an open end, and a side of the latch comprises a catch that sequentially passes through and hooks into the opening of the bezel and the catch opening of the front plate;

an E ring installed on the first straight segment;

a spring, the spring is inserted into the open end of the latch, and the first straight segment of the handle is inserted into the spring;

a first hook plate, the first hook plate is connected to a bottom side of the latch and an outer end of the first straight segment, and is fastened onto the front plate; and a second hook plate, wherein the second hook plate is connected to an outer end of the second straight segment and is fastened to the front plate, and the first hook plate and the second hook plate pass through the bezel and respectively pass through the hook openings.

14. The hard disk drive tray module according to claim 13, wherein the front plate further comprises two brackets protruding the front plate, and the first hook plate and the second hook plate are fastened to the brackets.

15. The hard disk drive tray module according to claim 13, wherein the bezel further comprises a face plate and a clasp, and the clasp protrudes the face plate.

16. The hard disk drive tray module according to claim 15, wherein the second straight segment is seated in the clasp.

17. The hard disk drive tray module according to claim 15, wherein the bezel comprises an upper panel and a lower panel respectively connected to the top and bottom edges of the face plate, and the upper panel and the lower panel protrude from the face plate.

18. The hard disk drive tray module according to claim 17, wherein the bezel further comprises two side blocks respectively located on the left and right edges of the face plate, and the side blocks are connected to the upper panel.

19. The hard disk drive tray module according to claim 18, wherein there is a slot between each of the side blocks and the face plate.

20. The hard disk drive tray module according to claim 19, wherein the first hook plate and the second hook plate pass through the slot between each of the side blocks and the face plate and the hook openings in sequence.

21. The hard disk drive tray module according to claim 17, wherein the upper panel and the lower panel each has a concave indentation.

22. The hard disk drive tray module according to claim 21, wherein the curved midsection of the handle is located between the concave indentation of the upper panel and the concave indentation of the lower panel.

23. The hard disk drive tray module according to claim 13, wherein the side of the latch further comprises an opening, and the first straight segment of the handle comprises an opening.

24. The hard disk drive tray module according to claim 23, wherein the hook device further comprises a pin, and the pin is located in the opening of the side of the latch and the opening of the first straight segment.

25. The hard disk drive tray module according to claim 13, wherein the latch is made of a powder metal injection material.

* * * * *